United States Patent

Gardner et al.

Patent Number: 5,156,236
Date of Patent: Oct. 20, 1992

[54] CLIMBING TREE STAND

[76] Inventors: Billy D. Gardner, 4830 Camellia Ave., N.W., Cleveland, Tenn. 37311;

[21] Appl. No.: 871,283

[22] Filed: Apr. 20, 1992

[51] Int. Cl.⁵ ............................................. A47C 9/10
[52] U.S. Cl. .................................... 182/187; 182/135
[58] Field of Search ............... 182/187, 134, 135, 188, 182/133, 136

[56] References Cited

U.S. PATENT DOCUMENTS

| | | | |
|---|---|---|---|
| 4,120,379 | 10/1978 | Carter | 182/187 |
| 4,331,216 | 5/1982 | Amacker | 182/187 X |
| 4,417,645 | 11/1983 | Untz | 182/187 X |
| 4,428,459 | 1/1984 | Peck | 182/187 |
| 4,802,552 | 2/1989 | Williams | 182/187 |
| 4,909,353 | 3/1990 | Govin et al. | 182/187 |
| 4,936,416 | 6/1990 | Garon | 182/187 |
| 5,101,934 | 4/1992 | Zambro | 182/187 |

Primary Examiner—Blair M. Johnson
Attorney, Agent, or Firm—Alan Ruderman

[57] ABSTRACT

Apparatus for climbing a tree has two frames, each frame having a rigid base portion with a flexible adjustable tree encircling band mounted thereon. A turnbuckle is connected to ends of each band for drawing together and separating the ends so as to change the effective length of the band. The rigid base portions of each frame have tree gripping edges which together with the bands and resiliently biased braces acts to secure each frame to the tree. Adjustment of the turnbuckles changes the attitude of the base relative to the ground. One of the frames is positioned above the other on the tree and they are alternatively raised up the tree or lowered down the tree. The upper frame includes a seat which hangs from the rigid base and is slidable, vertically adjustable and pivotable relative to the base. The lower frame has a platform upon which the feet of a user may rest while standing or seated on the seat. A pivotable brace member mounted on each base and resiliently urged against the tree acts to aid in holding each frame against the tree during the climbing phase and the upper brace member also functions as a backrest for the user.

19 Claims, 3 Drawing Sheets

CLIMBING TREE STAND

BACKGROUND OF THE INVENTION

This invention relates to a tree stand for hunters and more particularly to a climbing tree stand comprising two frames disposed one above the other which may be alternately raised by the user to a desired elevation on a tree, the frames each having attitude adjusting means for leveling the frames relative to the ground, and having comfortable and adjustable seating and back support means.

When hunting deer and certain other game, it may be necessary for a hunter to be in an elevated position within a tree to preclude the game from readily picking up the scent of the hunter. Thus, a substantial number of tree stands have been marketed which permit the hunter to remain in a location up in a tree. Certain of these stands are of the climbing variety, i.e., those stands which the hunter uses to climb up to the rest position. One such stand is illustrated in Amacker U.S. Pat. No. 4,331,216 which refers to a number of other such stands. This tree stand comprises a pair of frames, each having a platform. One frame is spaced above the other during use and the hunter sits on the upper frame with his or her feet on the lower frame. Although the tree stand illustrated in this patent has a substantial number of features and advantages over the prior art, it is uncomfortable in use. For example, when locked onto a tree either or both platforms generally are inclined and tilted relative to the ground. This provides an uncomfortable situation to the user and may place the user in a disoriented position. Although addressed in the aforesaid patent, deficiencies remain in the ease of adjusting the inclination relative to the ground. Moreover, since the user sits on a metal platform with no back support after a period of time in this condition, such as 8 to 12 hours, fatigue and pain may set in and the enjoyment of the hunt is then gone. The hunter also must sit in an exposed position on the upper platform and this, especially after a long period of time, can be unnerving. Another deficiency is that both frame members can be knocked accidentally loose from the tree during climbing and also in the hunting position.

SUMMARY OF THE INVENTION

Consequently, it is a primary object of the present invention to provide a climbing tree stand having an upper and a lower frame, the frames having adjusting means for readily and easily leveling a seat and a platform carried by the upper and lower frame respectively relative to the ground.

It is another object of the present invention to provide a climbing tree stand having an upper frame and a lower frame, the upper frame carrying a seat and a backrest, the seat being adjustable along the frame toward and away from the backrest, adjustable vertically and pivotable relative to the upper frame so that a hunter using the stand may vary his or her seating position and maintain his or her feet on a platform carried by the lower frame.

It is a further object of the present invention to provide a climbing tree stand having an upper frame and a lower foot supporting frame, the upper frame carrying an adjustable seat, the seat extending downwardly and being disposed between the upper frame and the lower frame to provide a hunter sitting thereon with a secure retained feeling.

Accordingly, the present invention provides a climbing tree stand comprising two frames, each frame including a rigid base portion and a flexible adjustable tree encircling band mounted thereon. Adjusting means is disposed in the end portions of the band to draw or separate the ends to change the effective length of the band and, as it acts together with a gripping edge of the rigid portion to grip the tree, to change the attitude of the rigid base portion. One of the frames is disposed above the other as each are raised alternately, the upper frame being raised and secured about the tree as the user stands on the lower frame and thereafter as the user sits on the upper frame, the lower frame is released from gripping the tree and is raised.

The upper frame includes a seat which hangs from and is slidably and vertically adjustable relative to the rigid base portion thereof, and is also pivotable relative to the rigid base. The lower frame has a platform upon which the feet of the user may rest. With the feet of the user on the platform, the seat may be readily pivoted relative to the upper frame so the user may choose different positions for comfort. A brace member is pivotably mounted on the rigid base portion of each of the upper and lower frames and is resiliently biased rearwardly against the tree and acts in conjunction with the gripping edge of the rigid portion on one side of the tree while the flexible portion acts on the opposite side of the tree. The brace member of the upper frame includes material so as to function as a backrest for the user while sitting in the tree.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENT

Figure 1:
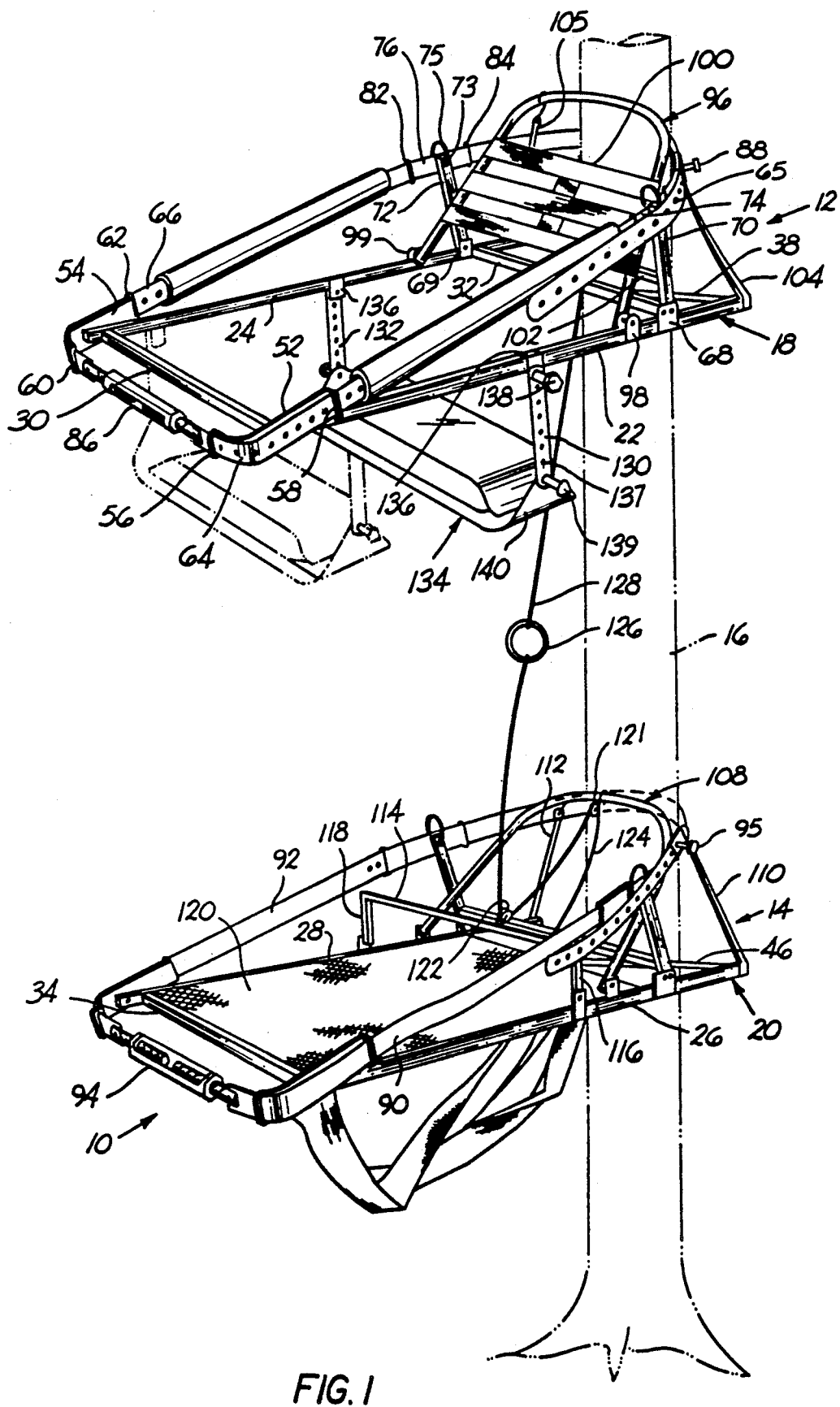
FIG. 1 is a perspective view of a climbing tree stand constructed in accordance with the principles of the present invention, the stand being illustrated in the operative position within a tree with one frame disposed above.

Referring to the drawings, a climbing tree stand constructed in accordance with the principles of the present invention is illustrated generally at 10 in FIG. 1, the stand comprising first and second frame members 12, 14 which in the operative disposition illustrated are disposed one above the other on a tree or other upright pole-like structure 16. Both the first or upper frame 12 and the second or lower frame 14 comprise a respective substantially rigid base 18, 20 each base having spaced apart side rails 22, 24 and 26, 28 respectively connected together by front and rear rails 30, 32 and 34, 36. The rear rails 34, 36 are spaced forwardly of the rear ends of the respective side rails for reasons which will hereinafter become clear. Each of the rails has a box-like cross-sectional configuration formed from metal such as steel to provide a strong and rigid structure. The cross-sectional configuration may also be of a channel or L-shape or the like form if desired.

Figure 2:
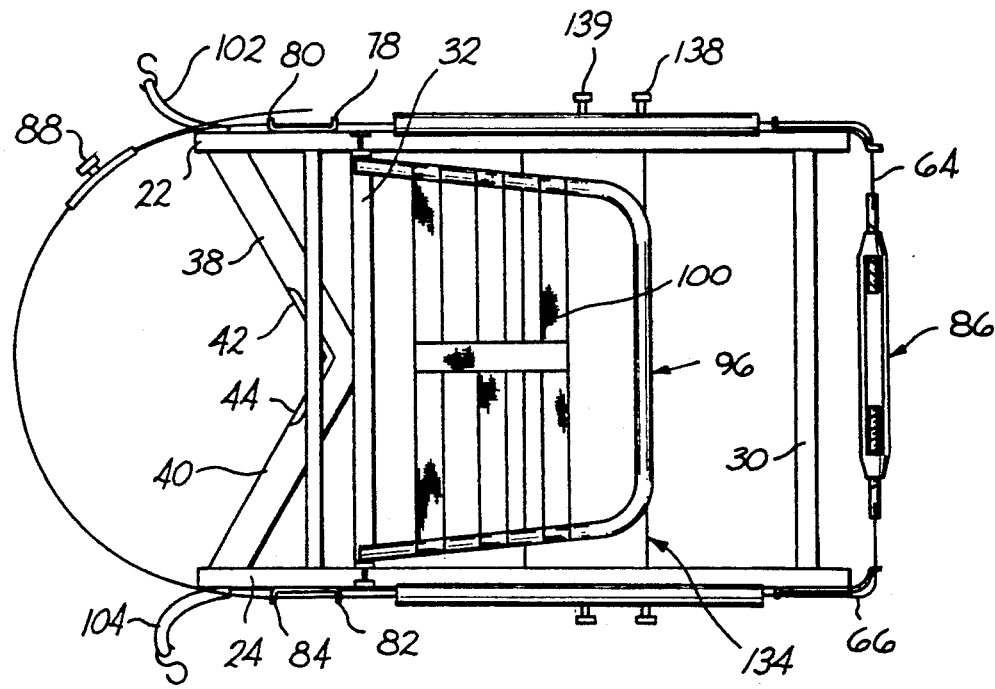
FIG. 2 is a top plan view of the upper frame in a folded or stowed condition.

Fixed to the upper base 18 between the respective side rails 22, 24 at the rear thereof and to the rear rail 32 is a respective tree engaging member 38, 40, the members 38, 40 being connected together at the location where they connect to the rear rail 32 so as to form the crotch of a rearwardly facing Vee therebetween as illustrated in FIG. 2. A respective sharpened edge 42, 44 is formed on the rear edge of each member 38, 40 and extends rearwardly for about half the length of the members 38, 40 from the junction where the members abut. The edges 42, 44 form a front tree gripping means for the upper frame. In a similar manner the base member 20 of the lower frame includes a pair of tree engaging members 46, 47 having respective sharpened edges 48, 50 for forming front tree gripping means for the lower frame.

Secured as by bolts or the like so as to pivot from a stowed condition to the operative position at the front of each of the side rails 22 and 24 adjacent the junction of the front rail 30 is a respective guide member 52, 54 comprising a metal strap bent from the plane of the respective side rail to the front. Each guide member at each end is bent and slotted to form a respective eyelet 56, 58 and 60, 62 having a rectangular configuration through which a respective flexible band 64, 66 passes as hereinafter further described. The bands 64, 66 are elongated strips of metal having apertures 65 at spaced longitudinal locations therein at least at the rear of the strips. Pivotably journalled on a respective upstanding tab 68, 69 adjacent the rear of each side rail 22, 24 is a respective bar 70, 72 at the upper end of which another metal strap guide member 74, 76 is removably fastened by a removable pin 73 which may be locked in place by a lock ring 75 attached to one end of the pin and attachable to the other end. Each of the guide members 74, 76 is formed with front and rear eyelets 78, 80 and 82, 84 for receiving the respective band 64, 66. The band 64 is threaded through the eyelets in each of the guide members 52 and 74 while the band 66 is threaded through the eyelets in the guide members 54 and 76 and the bands may be connected together to form a loop at the rear of the frame 18, the connection being by connecting means 88.

At the front of the frame 18 there is a turnbuckle 86 having one threaded member thereof connected to a respective front end of each band 64, 66. Thus rotation of the housing of the turnbuckle 86 in one direction or the other will draw or separate the ends of the bands 64, 66 to shorten or lengthen the composite length of the bands as they slide through the eyelets. Thus the front of the bands are adjustably connected by the turnbuckle while at the rear the bands are connected by the connecting means 88, which is in the form of a threaded screw-like member extending through a pair of aligned holes 65 in the two bands and secured by a nut-like member. The bands 64, 66 therefore may be released from each other at the rear, looped around the tree 16 and reconnected together at the rear of the tree while the tree engaging members 38, 40 engage the tree at the front thereof. The sharpened edges 38, 40 are pulled into the tree at the front while the bands 64, 66 grasp the rear of the tree due to the weight of the frames and the hunter. In this manner the frame 12 is secured to the tree 16 and the turnbuckle 86 may be rotated until the side rails 22 and 24 are level with the ground.

The lower frame 20 is substantially identical to the upper frame as heretofore described and also includes flexible bands 90, 92 connected at the front to a turnbuckle 94. Again the bands are releasably connected together at the rear by connecting means 95 so that the frame 14 may be firmly attached to the tree as the sharp edges 48, 50 act in conjunction with the bands.

The upper frame 12 includes a U-shape brace member 96 having legs spaced apart a distance substantially equal to the space between the rails 22, 24. The free ends of the legs are pivotably connected to tabs 98, 99 on the respective side rails 22, 24 so as to be pivotable toward the tree when in the operative disposition or pivotable to a disposition substantially planar with the side rails as illustrated in FIG. 2 in the stowed position. The tabs 98, 99 comprise inverted U-shaped members so as to be slidably adjustable along the length of the respective side rail 22, 24. Fabric or plastic webbing or the like 100 spanning the legs of the brace member 96 provide a backrest for the hunter while positioned within the tree. A bar 102 fixed to and spanning the legs 70, 72 acts as a brace to prevent the legs 70, 72 from collapsing inwardly and from twisting so as to hold the bands positioned properly. A pair of biasing means in the form of elastomeric bands 104, 106, which also may be coil springs or the like, are fastened to the rear ends of the side rails and are selectively attachable to the brace 96 to urge it rearwardly. Thus, in the operative position the brace 96 is pulled tightly against the front of the tree 16 above the edges 42, 44 to aid in securely gripping the tree, and is particularly helpful in the climbing mode.

The lower frame 14 also has a U-shape brace 108 pivotably mounted on the side rails 26, 28 and biased rearwardly by biasing means 110, 112 for grasping the tree in the operative position. A bar 114 having a pair of legs 116, 118 at the ends thereof spans the side rails 26, 28 of the lower frame, the legs 116, 118 being pivotably connected to the respective side rail. The length of the legs 116, 118 are such that when pivoted so that the bar is spaced above the side rails, and above a platform 120 connected to the side rails and the front rail 34, the hunter may place his or her feet between the bar 114 and the platform 120. Pulleys 121, 122 are respectively connected to the brace 108 and the bar 114 and a rope 124 is trained about the pulleys. One end of the rope is secured to the platform 120 while the other end is fastened to a ring 126 which is also connected to a rope 128 which may be carried by the upper frame so that the hunter can pull the rope 128 to grasp the ring 126 and thereby pull the rope 124. When the rope is pulled to overcome the bias of the biasing members 110, 112, the brace 108 pivots away from the tree and is again helpful in the climbing mode.

Carried on the upper frame 112 by each side rail 22, 24 is a respective leg 130, 132 of a cushioned seat 134. Each leg 130, 132 may comprise a metallic strip of metal similar to the bands 64, 66 and is connected at one end to a respective clip 136 positioned on and bent about a respective side rail 22, 24 into the cross sectional configuration of the side rails for sliding thereon, the connection of the legs 130, 132 to the clips being by means of threaded connectors 138 similar to the connectors 88, 95. Additionally, the other ends of the legs 130, 132 are connected to the ends of a metallic support 140 to which the cushion of seat 134 is secured, the connection being by threaded connectors 139, again similar to the connector 88. The clips 136 are slidable relative to the respective side rail so that the seat may be slidably moved from the front to the rear. Also, the legs 130, 132 may be connected to the clips 136 or the seat may be connected to the legs through different holes 137 therein by means of the connectors 138 or 139 so as to change the elevation of the seat relative to the base of the frame. Moreover, because of the connection of the seat to the frame in this manner, the seat may pivot as desired when one is seated thereon.

Figure 3:
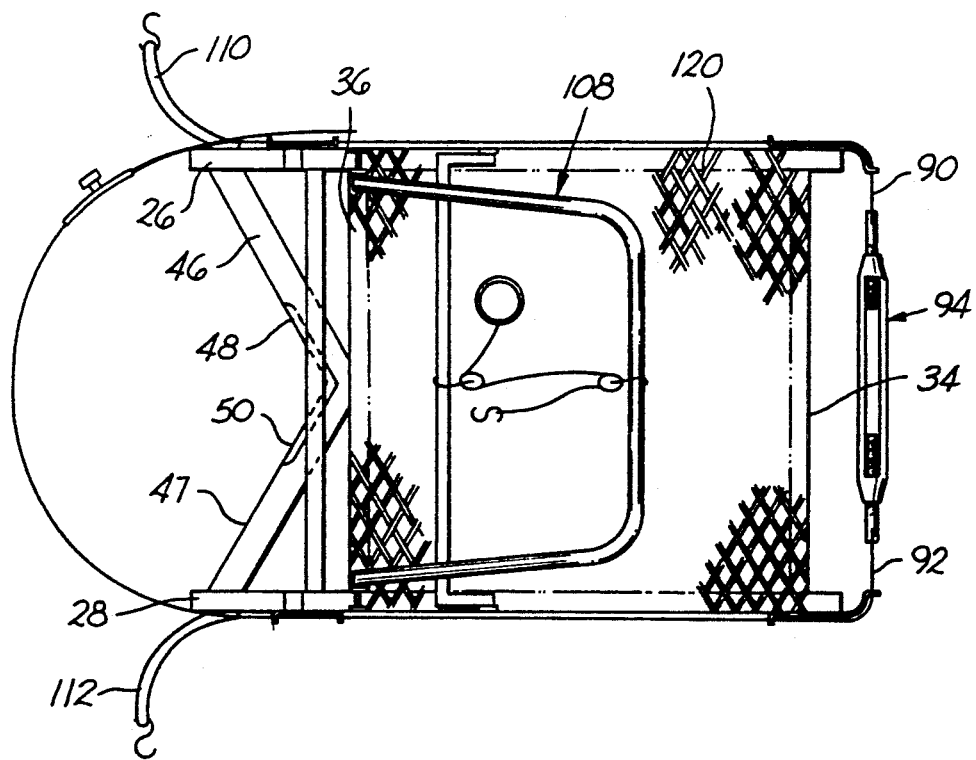
FIG. 3 is a top plan view of the lower frame in a folded or stowed condition.

As illustrated in FIGS. 2 and 3, both frames may be folded into a stowed condition when not in use. The braces 96, 108 are pivotably folded forwardly, the bands loosened and positioned on the side rails after the legs 70, 72 of the upper frame and the equivalent members on the lower frame are disengaged from the respective guide members and pivoted downwardly. Also the connectors 138, 139 are loosened and the seat may be pivoted to a planar disposition with the base 18. Thus, as illustrated in FIGS. 2 and 3 both frames may be folded into a substantially flat condition for storage and carrying.

Figure 4:
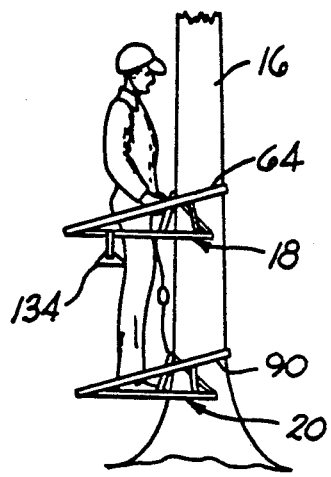
FIG. 4 depicts a step in raising the upper frame while the user stands on the lower frame.
Figure 5:
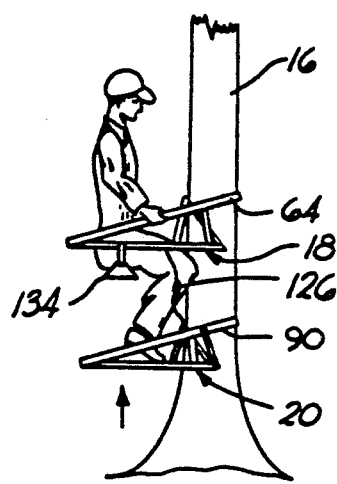
FIG. 5 depicts a step in raising the lower frame while the user is supported by the upper frame.

In operation, in the climbing mode, as illustrated in FIGS. 4 and 5, the upper frame 12 is first disposed adjacent the tree with the members 38, 40 facing the tree. The bands 64, 66 are looped about the tree and connected together so the bands and the members 38, 40 and the brace 96 snugly grip the tree. The lower frame 14 is likewise connected to the tree below the upper frame. The seat 134 is slid away from the tree and the hunter may then step through the space between the seat and the tree and stand on the platform 120 of the lower frame as illustrated in FIG. 4, the lower frame 14 being initially connected to the tree. Thereafter, the hunter may pull the brace 96 away from the tree to release the gripping action therebetween and pull the upper frame to a raised position on the tree. The upper frame bands may be adjusted, if necessary, so that the upper frame is leveled as desired. Thereafter, the hunter may sit on the seat as illustrated in FIG. 5, and position his or her feet between the rail 114 and the platform 120 and may thereafter pull the ring 126 to release the pressure between the brace 108 of the lower frame and the tree. The lower frame may then be raised by the feet of the hunter supporting the lower frame by means of the rail 114 as illustrated in FIG. 5. After the lower frame has been raised to a higher elevation, the bands of the lower frame may be adjusted if necessary and the hunter may again stand on the platform 120 of the lower frame. The hunter may then again loosen the connection between the upper frame by pulling on the brace member 96 away from the tree and raise the upper frame while standing on the lower frame. This procedure is continued until both frames are disposed at the desired location on the tree.

Figure 6:
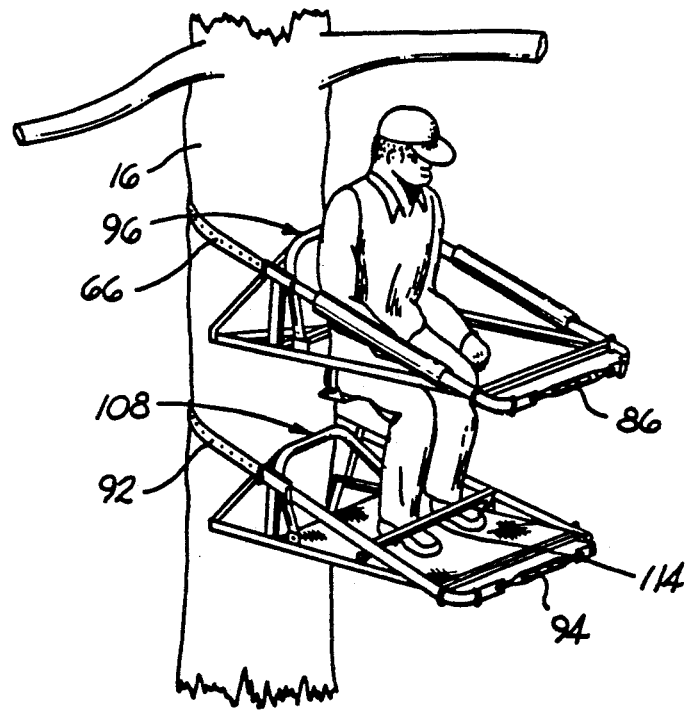
FIG. 6 illustrates the upper and lower frames in the operative position.

Once the desired location is reached, the seat is pushed rearwardly toward the tree and the turnbuckles 86 and 94 may be adjusted so that the attitude of the respective base member 18, 20 is substantially level with the ground. The hunter may then sit on the seat 134 of the upper frame with his or her feet on the platform 120 of the lower frame as illustrated in FIG. 6. Since the seat is positioned between the base 18 of the upper frame 12 and the lower frame, the hunter when seated is within or "housed" by the upper base and is provided with a secure feeling relative to prior art stands. Moreover, since the seat may slide toward and away from the tree and may be raised and lowered, the position may be varied to avoid the uncomfortable and tiring situation of prior art stands. Additionally, since the seat may pivot relative to the upper frame, the hunter may adjust the position of his or her body and feet to be reasonably comfortable.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. Climbing tree stand apparatus for climbing trees or the like to an elevated disposition, said apparatus comprising, a first frame for accommodating the body of a user, said frame including a rigid first base member having first rigid gripping means for engaging and gripping a first surface of said tree facing said gripping means, flexible elongated first band means, means for fastening said band means to said base member remote from said gripping means while permitting said band means to slide relative to said base member, said band means including a pair of bands connectable together to permit said band means to loop about said tree and engage a second surface of said tree opposed to and elevated relative to said first surface, adjustable means connected between ends of said pair of bands for drawing together and for separating said ends selectively to change the length of said band means and thus a loop made about said tree for changing the attitude of said base relative to said tree, a second frame for accommodating the feet of the user, said second frame including a rigid second base member having second rigid gripping means for engaging a third surface of said tree below said first surface, second flexible elongated band means, means for fastening said second band means to the base of said second member remote from said second gripping means while permitting said second band means to slide relative to said second base member, said second band means including a pair of bands connected together to permit said second band means to loop about said tree and engage a surface of said tree opposed to said third surface below said second surface, second adjustable means connected between ends of said pair of bands of said second band means for drawing together and separating the ends thereof selectively to change the length of said second band means and thus a loop it makes about said tree for changing the attitude of said second base relative to said tree, a seat for accommodating the user in a sitting disposition slidably carried by said first base and disposed beneath said first frame, and a platform carried by said second base for supporting the feet of a user sitting on said seat.

2. Climbing tree stand apparatus as recited in claim 1, wherein said means for fastening said first band means to said first base comprises band receiving guide means secured to said first base remote from said rigid gripping means at substantially the same elevation thereof, and band receiving guide means removably connected to said first base adjacent said rigid gripping means at an elevated disposition relative thereto, and said means for fastening said second band means to said second base comprises second band receiving guide means secured to said second base remote from said second rigid gripping means at substantially the same elevation thereof, and second band receiving guide means removably connected to said second base adjacent said second rigid gripping means at an elevated disposition relative thereto.

3. Climbing tree stand apparatus as recited in claim 1, including means for adjusting the vertical disposition of said seat relative to said first base.

4. Climbing tree stand apparatus as recited in claim 3, including means for pivotably journalling said seat relative to said first base.

5. Climbing tree stand apparatus as recited in claim 1, wherein each of said adjustable means comprises a turnbuckle disposed between ends of each pair of bands.

6. Climbing tree stand apparatus as recited in claim 5, wherein said means for fastening said first band means to said first base comprises band receiving guide means secured to said first base remote from said rigid gripping means at substantially the same elevation thereof, and band receiving guide means removably connected to said first base adjacent said rigid gripping means at an elevated disposition relative thereto, and said means for fastening said second band means to said second base comprises second band receiving guide means secured to said second base remote from said second rigid gripping means at substantially the same elevation thereof, and second band receiving guide means removably connected to said second base adjacent said second rigid gripping means at an elevated disposition relative thereto.

7. Climbing tree stand apparatus as recited in claim 5, including means for adjusting the vertical disposition of said seat relative to said first base.

8. Climbing tree stand apparatus as recited in claim 7, including means for pivotably journalling said seat relative to said first base.

9. Climbing tree stand apparatus as recited in claim 1, wherein each of said gripping means comprises a pair of tree engaging members connected together into a V-configuration defining a crotch therebetween, said members having sharpened edges adjacent said crotch for gripping and digging into said tree.

10. Climbing tree stand apparatus as recited in claim 1, wherein said first frame includes a brace having a substantially U-shaped configuration including a pair of spaced apart legs, means for pivotably mounting said legs at spaced locations on said first base for pivoting from a stowed position disposed substantially planar with said first base to an upright position, resilient means for biasing said brace toward said tree when in said upright position to aid in clamping said first frame to said tree and for use as a backrest for said user.

11. Climbing tree stand apparatus as recited in claim 10, wherein said second frame includes a second brace having a substantially U-shaped configuration including a pair of spaced apart legs, means for pivotably mounting the legs of said second legs at spaced apart locations on said second base for pivoting from a stowed position disposed substantially planar with said first base to an upright position, resilient means for biasing said second brace toward said tree when in said upright position to aid in clamping said second frame to said tree, and means for permitting the user to pull said second brace from said tree while said user is disposed in said first frame.

12. Climbing tree stand apparatus as recited in claim 3, wherein said first frame includes a brace having a substantially U-shaped configuration including a pair of spaced apart legs, means for pivotably mounting said legs at spaced locations on said first base for pivoting from a stowed position disposed substantially planar with said first base to an upright position, resilient means for biasing said brace toward said tree when in said upright position to aid in clamping said first frame to said tree and for use as a backrest for said user.

13. Climbing tree stand apparatus as recited in claim 12, including means for pivotably journalling said seat relative to said first base.

14. Climbing tree stand apparatus as recited in claim 5, wherein said first frame includes a brace having a substantially U-shaped configuration including a pair of spaced apart legs, means for pivotably mounting said legs at spaced locations on said first brace for pivoting from a stowed position disposed substantially planar with said first base to an upright position, resilient means for biasing said brace toward said tree when in said upright position to aid in clamping said first frame to said tree and for use as a backrest for said user.

15. Climbing tree stand apparatus as recited in claim 14, wherein said second frame includes a second brace having a substantially U-shaped configuration including a pair of spaced apart legs, means for pivotably mounting the legs of said second legs at spaced apart locations on said second base for pivoting from a stowed position disposed substantially planar with said first base to an upright position, resilient means for biasing said second brace toward said tree when in said upright position to aid in clamping said second frame to said tree, and means for permitting the user to pull said second brace from said tree while said user is disposed in said first frame.

16. Climbing tree stand apparatus as recited in claim 15, wherein each of said gripping means comprises a pair of tree engaging members connected together into a V-configuration defining a crotch therebetween, said members having sharpened edges adjacent said crotch for gripping and digging into said tree.

17. Climbing tree stand apparatus as recited in claim 16, including means for adjusting the vertical disposition of said seat relative to said first base.

18. Climbing tree stand apparatus as recited in claim 17, including means for pivotably journalling said seat relative to said first base.

19. Climbing tree stand apparatus as recited in claim 18, wherein said means for fastening said first band means to said first base comprises band receiving guide means secured to said first base remote from said rigid gripping means at substantially the same elevation thereof, and band receiving guide means removably connected to said first base adjacent said rigid gripping means at an elevated disposition relative thereto, and said means for fastening said second band means to said second base comprises second band receiving guide means secured to said second base remote from said second rigid gripping means at substantially the same elevation thereof, and second band receiving guide means removably connected to said second base adjacent said second rigid gripping means at an elevated disposition relative thereto.

* * * * *